(12) United States Patent
Oh et al.

(10) Patent No.: US 8,331,672 B2
(45) Date of Patent: Dec. 11, 2012

(54) METHOD AND APPARATUS FOR RECOGNIZING CHARACTER IN CHARACTER RECOGNIZING APPARATUS

(75) Inventors: Sang-Wook Oh, Ansan-si (KR); Seong-Taek Hwang, Pyeongtaek-si (KR); Sang-Ho Kim, Suwon-si (KR); Hee-Won Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 655 days.

(21) Appl. No.: 12/490,924

(22) Filed: Jun. 24, 2009

(65) Prior Publication Data

US 2009/0324081 A1 Dec. 31, 2009

(30) Foreign Application Priority Data

Jun. 24, 2008 (KR) .................. 10-2008-0059593

(51) Int. Cl.
*G06K 9/34* (2006.01)
(52) U.S. Cl. .................. 382/177; 382/176; 382/308
(58) Field of Classification Search .................. 382/176, 382/177, 182, 292, 301, 308
See application file for complete search history.

(56) References Cited

U.S. PATENT DOCUMENTS

| | | | | |
|---|---|---|---|---|
| 5,390,259 A | * | 2/1995 | Withgott et al. | 382/173 |
| 5,410,611 A | * | 4/1995 | Huttenlocher et al. | 382/177 |
| 7,911,629 B2 | * | 3/2011 | Shimizu | 358/1.14 |
| 2004/0057619 A1 | | 3/2004 | Lim et al. | |
| 2004/0240737 A1 | * | 12/2004 | Lim et al. | 382/182 |
| 2005/0008250 A1 | * | 1/2005 | Lim et al. | 382/266 |
| 2006/0008147 A1 | * | 1/2006 | Jung et al. | 382/176 |
| 2007/0019864 A1 | * | 1/2007 | Koyama et al. | 382/218 |

FOREIGN PATENT DOCUMENTS

| | | |
|---|---|---|
| CN | 1897015 | 1/2007 |
| CN | 1900933 | 1/2007 |
| JP | 02-195489 | 8/1990 |
| JP | 2004-110369 | 4/2004 |
| KR | 1019910014839 | 8/1991 |
| KR | 1020040023498 | 3/2004 |
| KR | 1020060065197 | 6/2006 |

OTHER PUBLICATIONS

Chen et al. "Text detection and recognition in images and video frames" Pattern Recognition, Elsevier, vol. 37, Issue 3, Mar. 2004, pp. 595-608.*

Jung et al., "Text information extraction in images and video: a survey" Pattern Recognition, Elsevier, vol. 37, Issue 5, May 2004, pp. 977-997.*

* cited by examiner

*Primary Examiner* — Stephen R Koziol
(74) *Attorney, Agent, or Firm* — The Farrell Law Firm, P.C.

(57) ABSTRACT

Disclosed is a method and an apparatus for recognizing a character and efficiently removing a misrecognized character. The method includes detecting character regions including at least one character in an input image, converting the input image into a binary image, discriminating the characters from a non-character, re-classifying the character region including a number of characters equal to or less than a threshold into a non-character region, and outputting only the characters present in the character region.

9 Claims, 5 Drawing Sheets

METHOD AND APPARATUS FOR RECOGNIZING CHARACTER IN CHARACTER RECOGNIZING APPARATUS

PRIORITY

This application claims priority under 35 U.S.C. §119(a) to a Korean Patent Application entitled "Method and Apparatus for Recognizing Character in Character Recognizing Apparatus" filed in the Korean Industrial Property Office on Jun. 24, 2008 and assigned Serial No. 10-2008-0059593, the contents of which are incorporated herein by reference.

BACKGROUND OF THE INVENTION

1. Field of the Invention

The present invention relates generally to a method and an apparatus for recognizing characters in a character recognizing apparatus, and more particularly to a method and an apparatus for recognizing characters in a character recognizing apparatus in which, when the character included in an input image is recognized, a misrecognized character can be efficiently removed.

2. Description of the Related Art

Character recognition is used when a document is scanned and converted into a text file or an electronic document. Recent developments in camera technology have caused a demand increase in character image processing by a camera in conjunction with mobile devices, such as Personal Data Assistants (PDAs) and cellular phones.

Contrary to the scanner to which a typical paper document is input, a camera performs character recognition by obtaining any type of character information. Character recognition using a camera recognizes any information such as a tourist location, various materials, a monument, a signboard, a business card and a menu. Character recognition using a camera can easily obtain and recognize characters by a portable camera, regardless of the medium in which the to-be-input characters are recorded, for which the research has been actively performed.

However, a disadvantage is that contrary to the scanner-based character recognition scheme, the condition under which the image is input is not limited so that the image recognized through the camera is significantly influenced by ambient light. Further, the camera-based character recognition scheme is not influenced by the environment. Thus, various types of characters are subjects for the recognition, and thus the rate of misrecognizing the character increases, making it difficult for the recognition apparatus to consistently perform.

According to a post-processing method in a conventional character recognition scheme, the character recognizing apparatus searches for a word including the characters recognized through the scanner in a database, such as a dictionary. If there is no corresponding word in the database, the apparatus determines the word as a misrecognized character. The character recognizing apparatus searches for the word most similar to the characters recognized through the scanner.

Generally, in recognizing characters using a camera, the background of the document is also photographed, as well as the document, and the photographed image includes both the document and the background. Therefore, the character recognizing apparatus or program receives the document image including the background, and cannot discriminate a document region from a background region. Thus, it even aims to recognize the characters in the background region. Particularly, the character recognizing apparatus misrecognizes the part having similar characteristics of the character in the background as the character, and includes the misrecognized character in the character recognition result. Accordingly, a broken character structure according to the recognition result occurs.

The foregoing camera-based character recognition scheme decreases the total rate of the character recognition, requiring the user to manually search for and delete each misrecognized result in the background. Such manual work for deleting the misrecognized character is inconvenient and unnecessarily time-consuming. As a further disadvantage, the manual work requires the user to directly select the document region in the photographed image. In addition, an apparatus for receiving the user input in the camera is limited to a button or touch screen. As many compact or automatic cameras do not even include a touch screen, users must bear the inconvenience of selecting the document region with a limited number of buttons. Furthermore, if the document region is in the form of a polygon and not a rectangle, the difficulty for the user to select only the document region is heightened.

Therefore, in order to improve the performance of the camera-based character recognition scheme, a need exists for a method and apparatus for recognizing a character having a post-processing function that can identify whether the character photographed by the camera is correctly recognized and amend the misrecognized character.

SUMMARY OF THE INVENTION

Accordingly, the present invention has been made to solve the above-stated problems occurring in the prior art, and an object of the present invention is to provide a method and an apparatus for recognizing characters in which, when the character included in an input image is recognized, a misrecognized character is efficiently removed.

In accordance with the present invention, there is provided a method for recognizing a character in a character recognizing apparatus, including converting an input image into a binary image and discriminating character regions each including at least one character and a non-character region, determining whether an invalid character region including a pre-stored or fewer number of characters (i.e., a number of characters equal to or less than a threshold) is present in the character regions and classifying the invalid character region into a non-character region, and determining a verified character region by removing the invalid character region from the character regions and outputting the characters included in the verified character region.

In accordance with the present invention, there is provided a character recognizing apparatus, including a character region detecting unit for detecting character regions each including at least one character in an input image, a binary image converting unit for converting the input image into a binary image and discriminating between the character regions and a non-character region that does not include a character, a controlling unit for determining whether an invalid character region including a number of characters equal to or less than a threshold is present in the character regions and, if so, re-classifying the invalid character region into a non-character region, and a character outputting unit for outputting a character included in a verified character region obtained by removing the invalid character region from the character regions.

In accordance with the present invention, there is provided a method for recognizing a character in a character recognizing apparatus, the method including detecting character regions each including at least one character in an input image and storing first location information on each of the character regions, generating a duplicate image having a size identical to that of the input image, converting the duplicate image into a binary image and discriminating the character regions and non-character region that does not include a character with a black and white color, performing a dilation operation among a morphology operation for the character regions and enlarging each of the character regions to a pre-stored size, determining whether an invalid character region including a threshold or fewer number of characters is present in the character regions, determining, if the invalid character region is present, a verified character region by removing the invalid character region from the character regions, and outputting the characters included in the verified character region.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Figure 1:
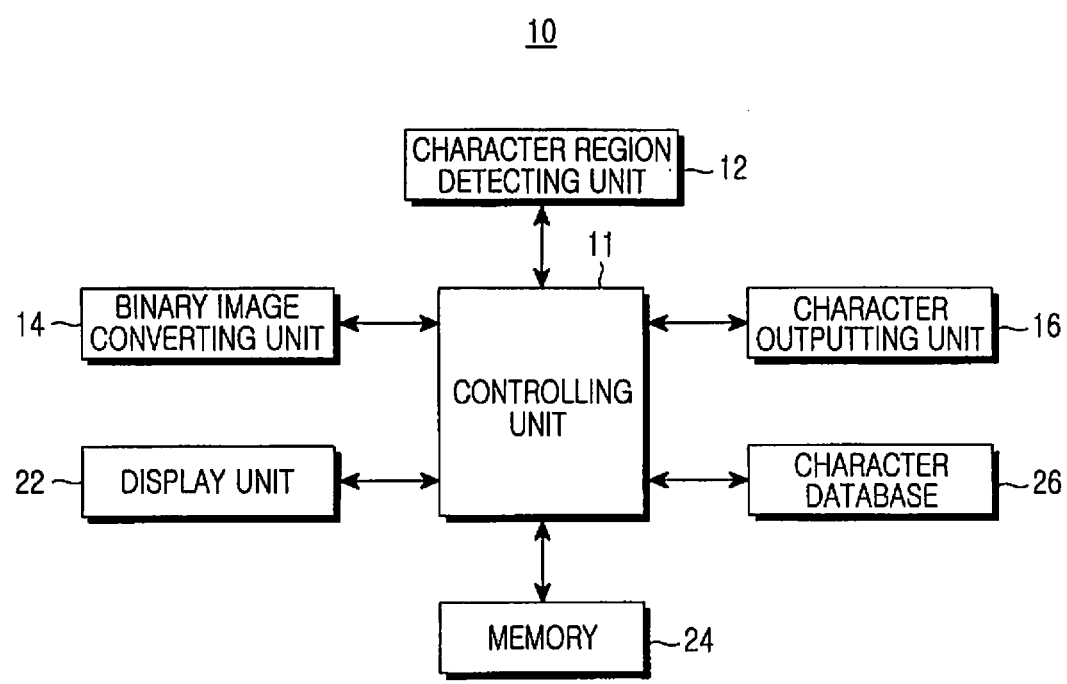
FIG. 1 illustrates a character recognizing apparatus according to the present invention.

Hereinafter, preferred embodiments of the present invention will be described with reference to the accompanying drawings. Identical reference numerals indicate identical elements throughout the specification and drawings. In the following description, detailed explanation of known related functions and constitutions may be omitted for the sake of clarity and conciseness.

According to the present invention, each of the regions being recognized to have at least one character in an input image is referred to as a character region, and a region that does not include a character is referred to as a non-character region. Further, each of the regions in which the character that is not the actual character in the input image is misrecognized as the character during character recognition processing, resulting in re-classification as a non-character, is referred to as an invalid character region, and a region including only the characters through removal of the invalid character region in the character regions is referred to as a verified character region.

FIG. 1 illustrates the character recognizing apparatus according to the present invention.

The character recognizing apparatus 10 includes a character region detecting unit 12, a binary image converting unit 14, a character outputting unit 16, a controlling unit 20, a display unit 22, memory 24, and character database 26.

The character region detecting unit 12 detects the character region from the image input through the character recognizing apparatus 10, i.e. the input image. At this time, the character region includes every region including at least one character, the non-character region includes the region that does not include a character, and the input image includes every image input through the character recognizing apparatus 10 for the character recognition.

In another embodiment, the character region detecting unit 12 detects the character region from the input image, and extracts location information on the character region. The character region detecting unit 12 can store the location information in the memory 24 under the control of the controlling unit 20 that will be described later herein.

The detection of the character region is implemented through converting the input image into a gray image or a recognition pre-processing required for the character recognition, such as correcting the character gradient or separating an individual character. The recognition pre-processing procedure is well known to one skilled in the art, and the present invention relates to the recognition post-processing after performing the recognition pre-processing. Thus, a description of the recognition pre-processing will be omitted.

The binary image converting unit 14 binary-processes the image input through the character recognizing apparatus 10 and converts it into a binary image represented in black and white. If the character region is detected by the character region detecting unit 12, the binary image converting unit 14 converts the input image in order for the character region and another region excluding the character region, i.e. the non-character region that does not include a character, to have a different binary value, respectively. For example, if the value of the character region is '0 (black)', the value of the non-character region is '1 (white)' and in contrary, if the value of the character region is '1', the value of the non-character region is '0'.

Further, the binary image converting unit 14 performs the dilation operation among the morphology operation for each of the character regions among the binary image under the control of the controlling unit 20 described later, to increase the size of the character region. If the size of the character region increases, the character region in which the distance decreases between the character regions or the character regions connected while having a contact point are generated. The binary image converting unit 14 repeats the dilation operation for a number of times pre-stored in the memory 24 under the control of the controlling unit 20 so that the adjacent character regions are connected with each other to generate at least one cluster, i.e. at least one character region group. A character region comprises a single character region being not connected with another or a character region group consisting of character regions being connected with each other.

The binary image converting unit 14 according to another embodiment of the present invention generates a duplicate image having a size identical to that of the image input through the character recognizing apparatus 10 under the control of the controlling unit 20, described later, and converts the duplicate image into the binary image. At this time, the binary image converting unit 14 converts the duplicate image into the binary image using the location information on the respective character regions extracted by the character region detecting unit 12.

If a region has the location value identical to that of the location information on the character region of the input image, the binary image converting unit 14 considers the region as the character region under the control of the controlling unit 20, and if a region does not have the location value identical to that of location information on the character region of the input image, the binary image converting unit 14 considers the region as the non-character region. The binary image converting unit 14 binary-processes the character region and the non-character region in black and white.

The character outputting unit 16 outputs the characters included in the character regions by using the character database 26 described later and output the characters included in the character region group generated by the plurality of character regions being connected, in a sentence or similar form. The character outputting unit 16 searches the character database 26, and if the characters having the form corresponding to the characters included in the character regions, are present, the character outputting unit 16 recognizes the to-be-output character as that word and outputs the word.

The controlling unit 20 determines whether an invalid character region including the threshold or fewer number of characters is present in the regions that are classified into the character regions. If the invalid character region is present, the controlling unit 20 re-classifies the corresponding invalid character region into a non-character region. An invalid character region comprises a single invalid character region being not connected with another or an invalid character region group consisting of invalid character regions being connected with each other.

The method of determining the threshold includes a passive determination method of receiving the user input and determining the threshold, and an automatic determination method of automatically determining the threshold through a calculation algorithm used for the character recognition. Further, the automatic determination method includes a fixed threshold determination method that has an identical threshold regardless of the input image and a variable threshold determination method that flexibly changes the threshold according to the input image.

The re-determination of the invalid character region as the non-character region by the controlling unit 20 uses the characteristic in which a plurality of characters accumulates while having a uniform arrangement or distance in a general document. The invalid character region including the threshold or fewer number of characters corresponds to the character included in the background of the input image, i.e. the background photographed together with the document during photographing, instead of the character to be recognized through the character recognizing apparatus 10. Therefore, the controlling unit 20 must remove those kinds of characters.

When the binary image converting unit 14 converts the input image into a binary image, the controlling unit 20 according to the present invention controls the binary image converting unit 14 to perform the dilation operation in the binary image morphology operation with respect to the character region. Through this, the size of the character region becomes larger than the actual size of the input image. Further, as the size of the character region increases, each of the character regions joins another adjacent character region. The controlling unit 20 controls the binary image converting unit 14 for enlarging each of the character regions until the adjacent character regions join together.

At this time, the distance between the character regions is the value pre-stored in the memory 24, described later, or the value arbitrarily determined according to the characteristics of the image input from the user.

The display unit 22 displays the character output through the character outputting unit 16 to provide the user with the output character. Further, the display unit 22 displays the binary image converted by the binary image converting unit 14.

The memory 24 includes program memory and data memory. The memory stores various information required for controlling the operation of the character recognizing apparatus 10. The memory 24 stores the threshold used by the controlling unit 20 for re-classifying the invalid character region that is the substantial non-character region, from the character region. Further, the memory 24 stores the location information on the respective characters extracted by the character region detecting unit 12.

The character database 26 stores every character capable of being output through the character outputting unit 16. The character outputting unit 16 searches to determine whether the character having the form identical to that of the character included in the respective character regions is present in the character database 26, and if so present, the character outputting unit 16 outputs the character included in the character region in the corresponding character. For example, assuming that the character included in the character region has the form of 'O⊢', the character outputting unit 16 searches for the character having the form identical to 'O⊢' included in the character region, i.e. the character stored as 'O⊢' in the character database 26. Accordingly, the character outputting unit 16 outputs the character included in the character region as 'O⊢' according to the search result.

Figure 2:
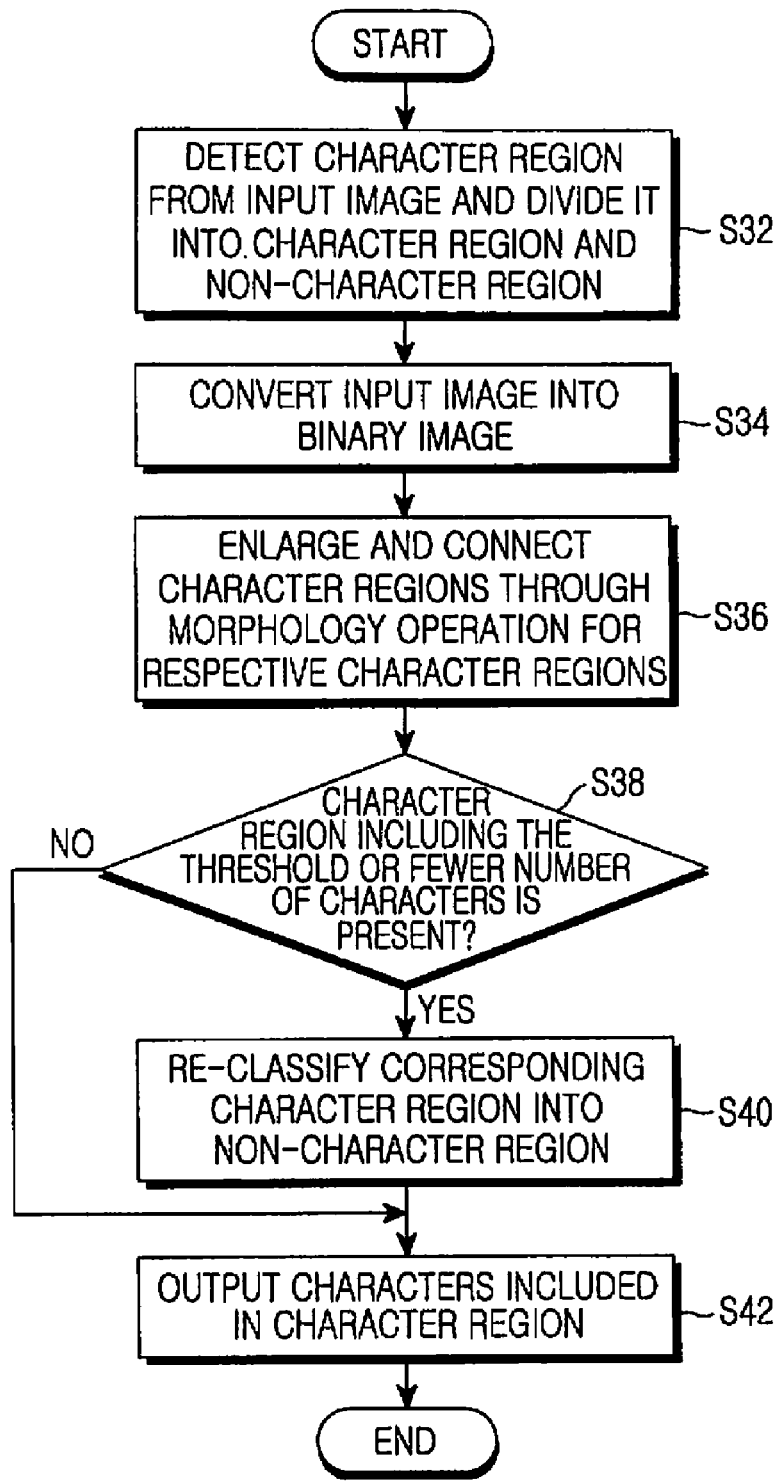
FIG. 2 illustrates a method of recognizing characters in a character recognizing apparatus according to the present invention.

FIG. 2 illustrates a method of recognizing characters in a character recognizing apparatus according to the present invention.

The character region detecting unit 12 of the character recognizing apparatus 10 detects the character region from the input image and divides it into the character region and the non-character region S32. Then, the binary image converting unit 14 converts the input image into the binary image in step S34. For example, the binary image converting unit 14 represents the character region by the color white having the value of '1', and the non-character region by the color black having the value of '0', and binary-processes and converts the input image.

The binary image converting unit 14 performs the morphology operation for the character region under the control of the controlling unit 20 and enlarges and connects the character region. Preferably, the binary image converting unit 14 applies the dilation operation among the morphology operation to the character region, to increase the actual size of the character region capable of being displayed in the binary image converted in step S34. Further, due to the enlarging of the character region, a contact point may be generated because the adjacent character regions in the respective character regions are connected with each other.

The binary image converting unit 14 can generate the character region group by expanding the character regions for connecting and joining the character regions which are adjacent within the preset distance. As such, the character recognizing apparatus 10 unifies into one cluster the characters that need to be recognized, to discriminate the cluster from the non-character region, and the controlling unit 20 can consider one character region group as one character region.

As described above, if the character region and the non-character region are divided, the controlling unit 20 determines whether an invalid character region including the threshold or fewer number of characters, (i.e., the number of characters equal to or less than the threshold) is present in step S38. If the invalid character region is not present, the controlling unit 20 controls the character outputting unit 16 and outputs the characters included in the character region in step S42.

If the invalid character region including characters the number of which is equal to or less than the threshold is present, the controlling unit 40 re-classifies the corresponding invalid character region into the non-character region in step S40, since part of the regions classified into the character region in step S32 is the non-character region. If there is another character region that is adjacent within the distance pre-stored in the memory 24 in the character region, even though the character region is enlarged through step S36, the controlling unit 20 determines that the character is not included in the character region.

In a typical document structure, as the distance between the individual characters shortens and the arrangement of the characters is uniform, when enlarging the character region in step S36, the character region occupied by the words is expanded so that the contact point or the character region group is generated. Therefore, if the distance between the character region and another character region is equal to or greater than the pre-stored value (hereinafter threshold distance) even though the processing of enlarging the character region has been performed, the controlling unit 20 determines that the character region does not actually include the character so as to re-determine the character region as the non-character region.

At this time, the threshold distance used for determining whether the character is actually included in the character region can be the value that is pre-stored in the memory 24. Further, even though the contact point between the character region and another character region is generated, if the distance or arrangement of the character regions is not uniform, the controlling unit 20 can re-determine the character region as the non-character region since the arrangement of the characters in a typical document structure is uniform and regular.

The controlling unit 20 controls the character outputting unit 16 to output the characters included in only the character regions excluding the character region that is re-classified as the non-character region in step S40, in step S42.

FIGS. 3A to 3F illustrate the character image employing the character recognition in a processing sequence of the character recognition according to the present invention.

Figure 3A:
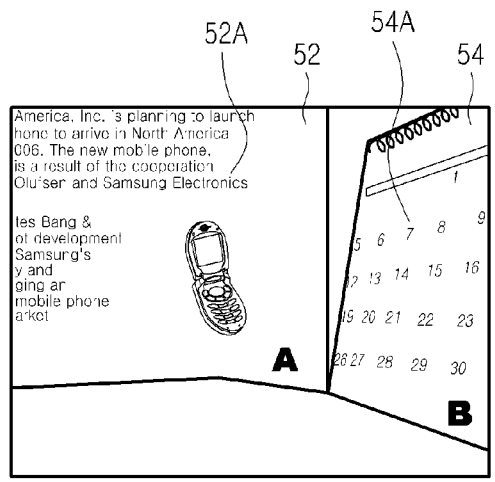
FIG. 3A illustrates an input image according to the present invention.

FIG. 3A illustrates an input image according to the present invention. The input image can be input in the character recognizing apparatus 10 through a camera (not shown), for example. It is assumed that the character recognizing apparatus 10 according to the present invention must recognize the characters 52A included in the A zone 52.

Figure 3B:
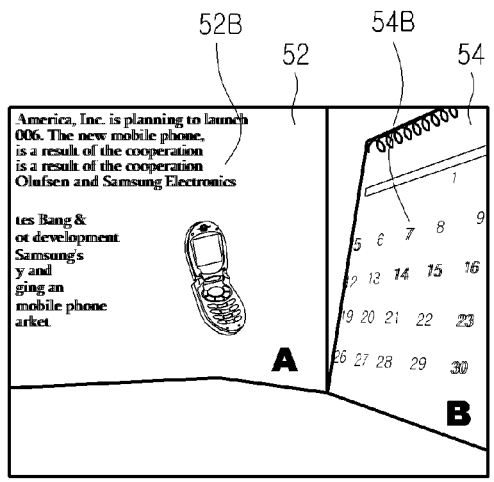
FIG. 3B illustrates an input image when the character region is detected by a character region detecting unit according to the present invention.

FIG. 3B illustrates the input image when the character region is detected by the character region detecting unit 12 according to the present invention. Referring to FIG. 3B, the character regions 52B and 54B are detected in both the A zone 52 and the B zone 54. A calendar in the B zone 54 is included in the input image as the background. The character region detecting unit 12 recognizes the numbers of the calendar as the characters, and if it recognizes even the numbers in the B zone 54 as the characters, errors may occur in the character outputting process. Thus, that it is preferred that the character regions 54B in the B zone 54 are removed.

Figure 3C:
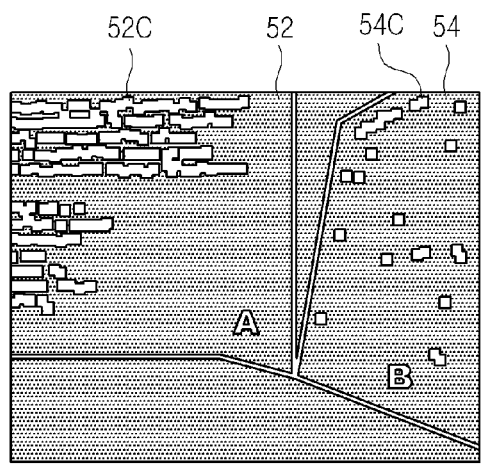
FIG. 3C illustrates a binary image into which an image of FIGS. 3A and 3B is converted by a binary image converting unit according to the present invention.

FIG. 3C illustrates a binary image into which the image of FIGS. 3A and 3B is converted by the binary image converting unit 14 according to the present invention. Referring to FIG. 3A, the binary image converting unit 14 converts the input image in order for the character regions 52C and 54C to have the value of '1 (white color)' and for the non-character region to have the value of '0 (black color)'.

Figure 3D:
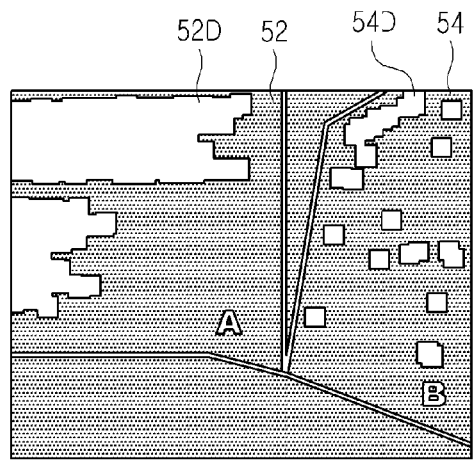
FIG. 3D illustrates a result obtained by employing a dilatation operation in a morphology operation to each of the character regions of the binary image of FIG. 3C.

FIG. 3D illustrates a result obtained by employing the dilatation operation in the morphology operation for each of the character regions 52C and 54C of the binary image of FIG. 3C. Referring to FIG. 3D, all the character regions 52D are connected with each other so as to form one cluster in the A zone 52 in which the characters to be recognized by the character recognizing apparatus 10 accumulate. Even if the character regions 54D of B zone 54 are enlarged, the respective characters are scattered. Accordingly, the character is discriminated from the non-character. The controlling unit 20 re-classifies the character regions 54D of the B zone into the non-character region.

Figure 3E:
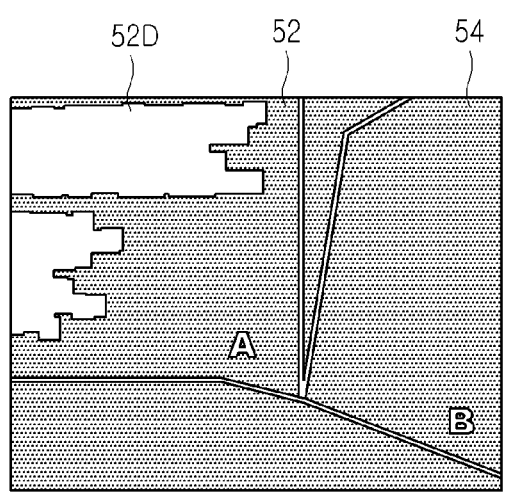
FIG. 3E illustrates the character region of the B zone that is re-classified into a non-character region by a controlling unit according to the present invention.

FIG. 3E illustrates the character region of B zone 52 that is re-classified into the non-character region by the controlling unit 20 according to the present invention. Referring to FIG. 3E, all of B zone 54 has the value of '0'. The controlling unit 20 of the character recognizing apparatus 10 controls the binary image converting unit 14 to re-convert the input image for the region that has been re-classified into the non-character region to have the value of '0'.

Figure 3F:
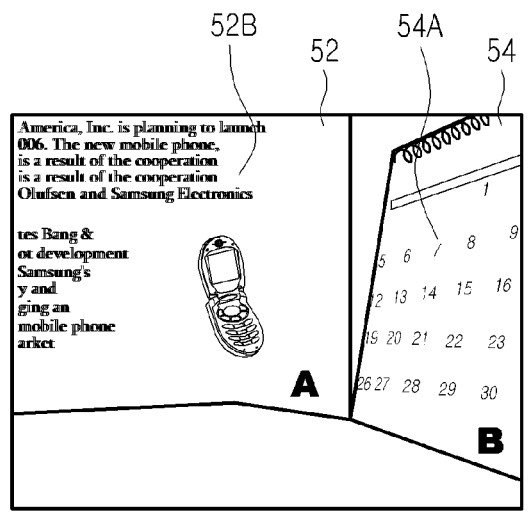
FIG. 3F illustrates the finally divided character region and non-character region according to the present invention.

FIG. 3F illustrates the finally divided character region and non-character region according to the present invention. Referring to FIG. 3F, all the characters in A zone 52 are represented as the character regions 52B and every character 54A in B zone 54 is classified into the non-character region so that the calendar of B zone 54 is the background.

Figure 4:
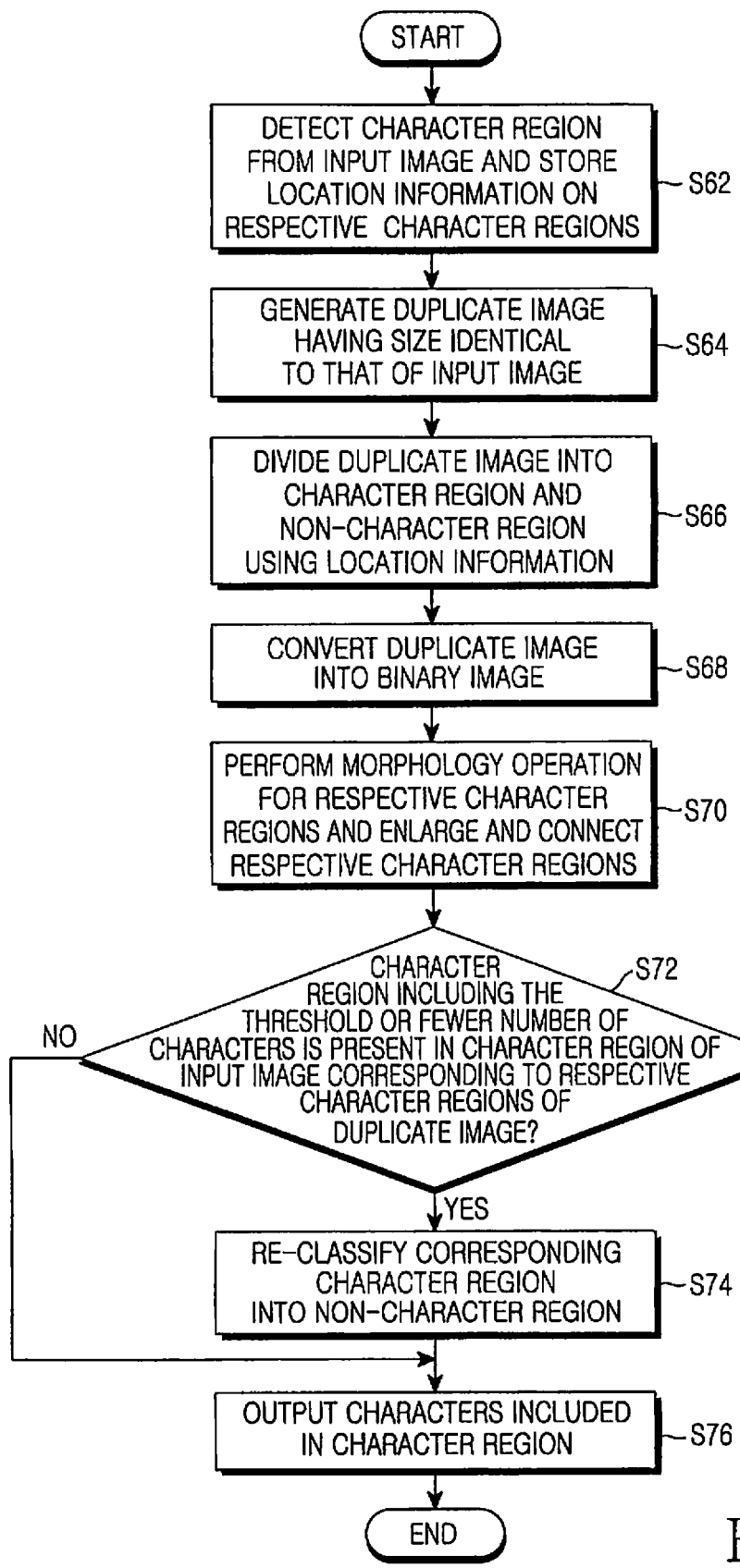
FIG. 4 illustrates a method for recognizing characters in a character recognizing apparatus according to the present invention.

FIG. 4 illustrates a method for recognizing characters in the character recognizing apparatus according to the present invention.

The character region detecting unit 12 detects the character region from the input image and extracts location information on the respective character regions and stores the extracted location information in the memory 24, in step S62. The binary image converting unit 14 generates the duplicate image having the size identical to that of the input image in step S64, and the character region detecting unit 12 divides the duplicate image into the character region and the non-character region using the location information stored in the memory 24 under the control of the controlling unit 20, in step S66.

When the input image has the resolution of '1024×768 pixel', the duplicate image has the same resolution, which indicates the identical size. Therefore, if an identical coordinate axis is applied to the input image and the duplicate image, the location information on the location of the input image can be applied to the duplicated image. That is, if the input image has the coordinate points (3,3), the duplicate also has the coordinate points (3,3). As such, the input image and the duplicate image have the identical size so that the character recognizing apparatus 10 can accurately recognize the region corresponding to the character region of the input image in the duplicate image. Further, the character recognizing apparatus 10 accurately recognizes the character region of the input image to discriminate it from the non-character region even in the duplicate region, to display the character region.

The binary image converting unit 14 converts the duplicate image into the binary image in step S68, in order for the character region and the non-character region to have the different values. The binary image converting unit 14 refers to the location information on the respective character regions stored in the memory 24 and displays the region of the duplicate image having the location identical to the location information on the character region of the input image as the character region. The binary image converting unit 14 performs the morphology operation for the respective character regions of the duplicate image under the control of the controlling unit 20 and enlarges and connects the respective character regions in step S70.

The controlling unit 20 determines whether an invalid character region including the threshold or fewer number the characters, is present in the character region of the input image corresponding to the respective character regions of the duplicate image in step S72. The controlling unit 20 determines whether the number of characters included in the region corresponding to the location information of the input image is equal to or less than the threshold using the location information corresponding to the respective character regions of the duplicate image. When the respective character regions are enlarged by the morphology operation and the adjacent character regions are connected into one cluster in step S70, the controlling unit 20 considers the cluster as one character region.

As a result of the determination in step S72, if the threshold or fewer number of characters is included in the character region, the controlling unit 20 re-classifies the corresponding character region into the non-character region in step S74. The controlling unit 20 deletes the location information corresponding to the invalid character region that has been re-classified into the non-character region in step S74 from the location information stored in the memory 24. Thus, the unnecessary information is deleted, leaving only the location information on the character region including the to-be-output characters in the character recognizing apparatus 10. The controlling unit 20 controls the character outputting unit 16 to output the characters included in the character regions in step S76. The character outputting unit 16 refers to the location information stored in the memory 24 to output only the characters included in the corresponding region.

As a result of the determination in step S72, if the threshold or fewer number of characters is not included in the character region, the controlling unit 20 controls the character outputting unit 16 to output all the characters included in the character regions classified in step S62, in step S76.

Therefore, the present invention provides a method and apparatus for recognizing the characters in the character recognizing apparatus in which, when the character included in an input image is recognized, a misrecognized character is efficiently removed.

Further, by removing the misrecognized character, the present invention decreases errors during input image processing by outputting the correct error-removed character.

While the present invention has been shown and described with reference to the preferred embodiments and drawings thereof, it will be understood by those skilled in the art that various changes in form and details may be made therein without departing from the spirit and scope of the invention as defined by the appended claims.

What is claimed is:

1. A method for recognizing a character in a character recognizing apparatus, the method comprising:
converting an input image into a binary image and discriminating between character regions each including at least one character and a non-character region that does not include a character;
determining whether an invalid character region having a number of characters equal to or less than a threshold is present in the character regions and classifying the invalid character region into a non-character region; and
determining a verified character region by removing the invalid character region from the character regions and outputting the characters included in the verified character region,
wherein discriminating between the character regions and the non-character region includes:
enlarging each of the character regions to a pre-stored size,
detecting an adjacent character region within a pre-stored distance of an enlarged character region, and
if the adjacent character region is detected, connecting the adjacent character region with the enlarged character region to form a character region group.

2. The method as claimed in claim 1, wherein discriminating between the character regions and the non-character region includes black-and-white processing the character regions and the non-character region by representing the character regions in black, different from the non-character region, which is represented in white.

3. The method as claimed in claim 1, wherein discriminating between the character regions and the non-character region includes black-and-white processing the character regions and the non-character region by representing the character regions in white, different from the non-character region, which is represented in black.

4. The method as claimed in claim 1, further comprising outputting the characters included in the character regions if the invalid character region including the number of characters equal to or less than the threshold is not present in the character regions.

5. A character recognizing apparatus, comprising:
a character region detecting unit for detecting character regions each including at least one character in an input image;
a binary image converting unit for converting the input image into a binary image and discriminating between the character regions and a non-character region that does not include a character;
a controlling unit for determining whether an invalid character region including a number of characters equal to or less than a threshold is present in the character regions and, if the invalid character region is present, re-classifying the invalid character region into a non-character region; and
a character outputting unit for outputting a character included in a verified character region obtained by removing the invalid character region from the character regions,
wherein the binary image converting unit enlarges each of the character regions to a pre-stored size,
wherein the controlling unit detects an adjacent character region within a pre-stored distance of an enlarged character region, and
wherein, if the adjacent character region is detected, the binary image converting unit forms a character region group by connecting the adjacent character region with the enlarged character region.

6. The character recognizing apparatus as claimed in claim 5, wherein the binary image converting unit represents the character region in a black color and the non-character region in a white color.

7. The character recognizing apparatus as claimed in claim 5, wherein the binary image converting unit represents the character region in a white color and the non-character region in a black color.

8. The character recognizing apparatus as claimed in claim 5, wherein the binary image converting unit performs a dilation operation among a morphology operation for the character regions to form the character region group.

9. The character recognizing apparatus as claimed in claim 5, wherein the controlling unit controls the character outputting unit to output the characters included in every character region in the character regions if the invalid character region including a number of characters equal to or less than a threshold is not present in the character regions.

* * * * *